*(12)* United States Patent
Hotz et al.

(10) Patent No.: US 7,373,339 B2
(45) Date of Patent: May 13, 2008

(54) METHOD AND SYSTEM FOR LINKING PERSONNEL, ORGANIZATIONAL, AND BUDGETARY ELEMENTS

(75) Inventors: Thomas Hotz, Bruchsal (DE); Andy Peichl, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 549 days.

(21) Appl. No.: 10/883,814

(22) Filed: Jul. 6, 2004

(65) Prior Publication Data

US 2006/0010121 A1    Jan. 12, 2006

(51) Int. Cl.
*G06F 17/30* (2006.01)
(52) U.S. Cl. .................. 707/3; 707/104.1; 705/30
(58) Field of Classification Search ............ 707/3, 707/10, 104.1; 705/9, 30
See application file for complete search history.

(56) References Cited

U.S. PATENT DOCUMENTS

| | | | | |
|---|---|---|---|---|
| 5,111,391 A | * | 5/1992 | Fields et al. ............... | 705/9 |
| 5,164,897 A | * | 11/1992 | Clark et al. ................ | 705/1 |
| 6,049,776 A | * | 4/2000 | Donnelly et al. ........... | 705/8 |
| 6,742,002 B2 | * | 5/2004 | Arrowood .............. | 707/104.1 |
| 6,915,265 B1 | * | 7/2005 | Johnson .................... | 705/2 |
| 2004/0225521 A1 | * | 11/2004 | Acosta et al. ............ | 705/1 |

\* cited by examiner

*Primary Examiner*—Leslie Wong
(74) *Attorney, Agent, or Firm*—Kenyon & Kenyon LLP

(57) ABSTRACT

Methods and systems to link personnel, organizational, and budgetary elements in disparate databases are described. In one embodiment, a method in accordance with the invention may include forming a query from a first set of attributes from a first database and a second set of attributes from a second database, determining, from a third database, an index value that is associated with both the first set and the second set of attributes, and outputting the index value to a user. A system in accordance with the invention may include a processor, an output device, and a memory. The memory may include at least three databases.

14 Claims, 3 Drawing Sheets

METHOD AND SYSTEM FOR LINKING PERSONNEL, ORGANIZATIONAL, AND BUDGETARY ELEMENTS

BACKGROUND

1. Technical Field

Embodiments of the present invention generally relate to methods and systems to link personnel, organizational, and budgetary elements in disparate databases.

2. Discussion

It is often necessary to fill employment positions with personnel whom a manager or supervisor has little if any experience. In large organizations the problem is particularly troublesome as hundreds, thousands, or even tens of thousands of records may be considered in order to place the most qualified and/or desirable person in the needed position. To further complicate the matter, an organization is typically constrained by budget considerations. If it is necessary to staff a project with personnel, the number of personnel must be adjusted based on their salaries and the budget amount allocated for the project.

In some situations, it may be necessary to staff a project with personnel from multiple organizations. Such situations are extremely problematic as different organizations rarely, if ever, have common pay scales and job descriptions.

However, most organizations do maintain employment records for their employees. The accumulation of employment records is typical for public and private business organizations, government organizations, and military organization. Employment records, usually stored in electronic databases, typically may include at least employees' names, addresses, identification numbers, and dates on which the employees first began to work for the organization. Other information may also be stored.

Organizations also frequently maintain databases that include details concerning the various projects on which the organization is working. Databases of information also exist for various projects in a planning stage, or in a pre-contract stage, such as a bidding stage. For example, an organization may maintain budgetary records related to the numbers and qualifications (desired or actual) of personnel needed to staff a project. Information concerning both personnel and projects may also be needed to complete certain reports required for submission to government and/or financial institutions.

BRIEF DESCRIPTION OF THE DRAWINGS

The various advantages of embodiments of the present invention will become apparent to one skilled in the art by reading the following specification and appended claims, and by referencing the following drawings.

DETAILED DESCRIPTION

Described herein is a system and method that may be used to link data from disparate databases by way of associating that data with a unique identifier stored in another database. In one embodiment, the unique identifier may be known as a job index key number. A job index key number may be used to match personnel with job openings. The system and method preferably use data from personnel, organisation, and budgetary databases, as well as data from a job index key number database and a job index key number description database. Alternate, fewer, or additional databases may be used without departing from the scope of the invention.

A method in accordance with the invention may link the various pieces of information previously stored in disparate databases. This linking may provide a unified result to questions concerning, for example, the identity of a particular candidate to fill a position (using data from a human resources system), the title of a newly created position (using data from an organization management system), and/or budgetary information (using data from a cost estimating or bid generation system). A user may input, using any known input device, data to form a query. The query may be used to initiate a process whose end-result is a job index key number and/or associated job index key number description. The system and method may utilise a processor to evaluate the query and execute a search of data in one or more databases and may present the job index key number and/or associated job index key number description to the user via a display device, printer, or other output device.

Each job index key number may be an identifier that is associated with a unique set of attributes. The attributes may be comprised of attributes stored in personnel, organisation, and budgetary databases, or may be input by the user. A job index key number preferably identifies one unique combination of personnel, organisation, and budgetary attributes.

The possible number of unique combinations of personnel, organisation, and budgetary information may be determined by the number of sub-areas included within each of the main areas of personnel, organisation, and budgetary data. Sub-areas may be further divided. Examples of sub-areas in a personnel database may include "remuneration data," "organisational assignments," "employee groups," while further subdivisions may include "employee sub-groups" and "pay-scale groupings." Examples of sub-areas in an organisation database may include "organisational structure information," "planned compensation," "finance," "engineering," or "manufacturing." Examples of sub-areas in a budgetary database may include "master budget for project X," or "personnel budget for equipment maintenance operations." The number of unique combinations of personnel, organisation, and budgetary information is not a limitation on the scope of the invention.

Figure 1:
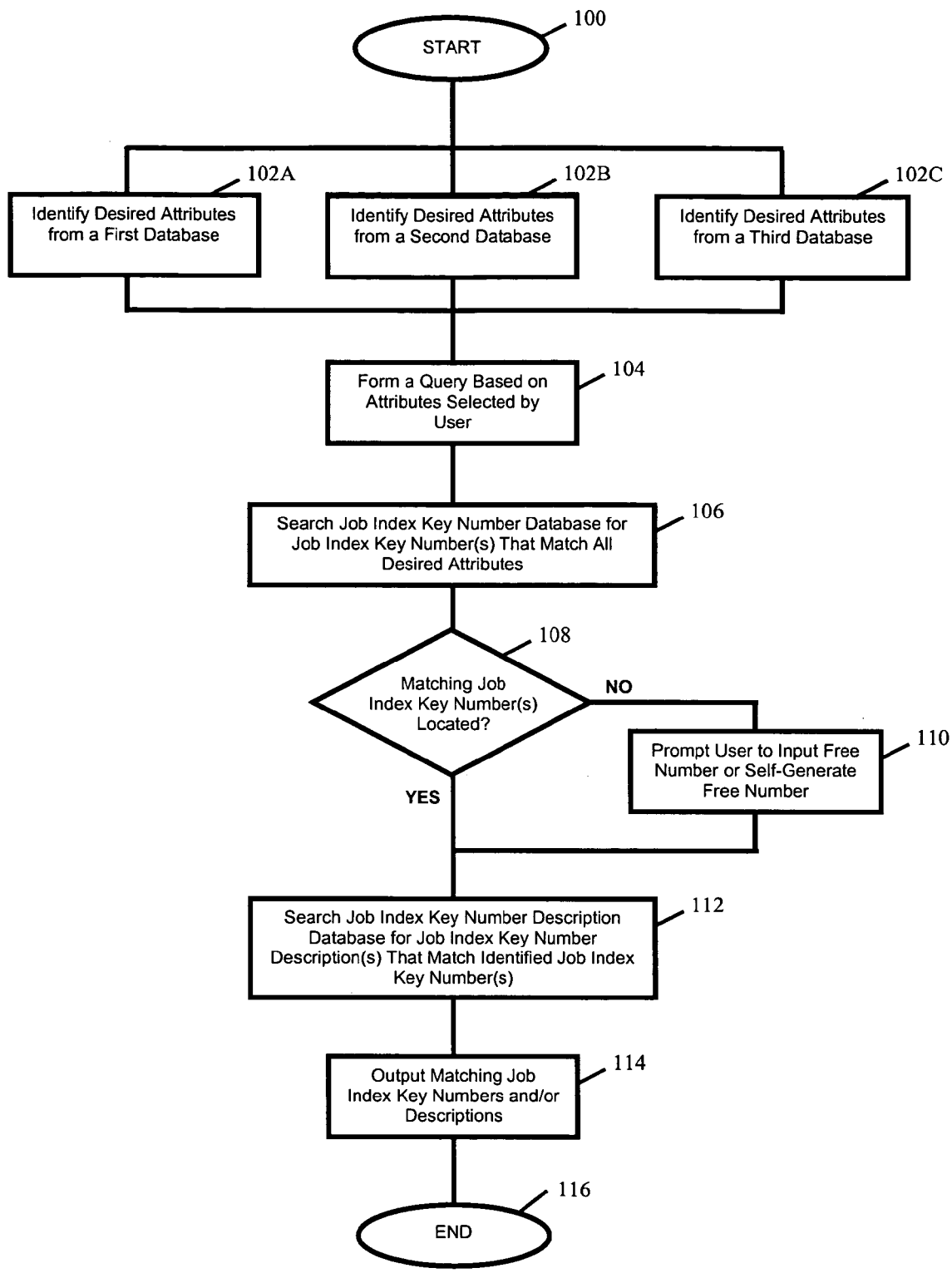
FIG. 1 illustrates a method of determining a job index key number in accordance with an embodiment of the invention.

FIG. 1 illustrates a method of determining a job index key number in accordance with an embodiment of the invention. The method may begin at 100. At 102A, a user may identify attributes or parameters that may be associated with data stored in a first database. The first database may include information related to a first main area. In one embodiment, the first main area may be identified as a "personnel" area. At 102B, a user may identify attributes that may be associated with data stored in a second database. The second database may include information related to a second main area. In one embodiment, the second main area may be identified as an "organisation" area. At 102C, the user may identify attributes that may be associated with data stored in a third database. The third database may include information related to a third main area. In one embodiment, the third main area may be identified as a "budgetary" area.

It is noted that while the example described above uses three databases pertaining to three disparate subject matters (i.e., three main areas), nothing in this disclosure is meant to limit the number of databases or qualify the subject matter examined. Additionally, not all databases associated with a method or system embodying the invention described herein need to be selected or executed by a user. In some cases there may be an and/or relationship between the subject matter of these database. For example, if attributes in a third database are not of concern to a user, then it is sufficient to execute searches in a job index key number database of only those attributes in a user's query from the first and second databases. Using the language of the exemplary main areas described above, if budgetary requirements are not of concern to a user, then it is sufficient to execute searches in the job index key number database for job index key numbers associated with user selected attributes in the personnel database (102A) and the organization database (102B).

Attributes selected from any main area may comprise all of the attributes included in the main area or a subset thereof. If the desired attribute is not available for selection, then a neutral value may be used. In one embodiment, a user may enter its own information as sub-area attributes. That is, if a sub-area does not exist in the database, then the user can add a new sub-area to the database. All data related to selected attributes may be used at decision evaluation points in a decision tree.

At 104, a query may be formed that incorporates each of the desired attributes selected by the user. At 106, a system or method in accordance with an embodiment of the invention may use the query to search a job index key number database for a job index key number, or numbers, that match all desired attributes. One method of determining a job index key number may involve the use of a decision tree. A processor executing the function of a decision tree, for example at 106, may access the personnel, organization, and budgetary databases, in addition to the job index key number database, to match the requested parameters with one or more job index key numbers. At 108, a determination may be made as to whether at least one job index key numbers have been identified in the search. If yes, then the method may continue to 112. If no, then the method may continue to 110. At 110, if a job index key number cannot be identified that matches all desired attributes, then a method or system in accordance with the invention may either generate a new job key index number or prompt the user to enter a job key index number. For example, if no organizational attributes for an area of activity can be determined for a budget structure element, a free job index key number can be generated or entered. The capability to allow self-generation of job index key numbers or of prompting a user to enter its own job index key numbers, may be enabled or disabled at a user's option.

At 112, a search of a job index key number description database may be executed in order to match any identified job index key number(s) with associated job index key number description(s). At 114, the job index key number(s) that match the requested attributes, as well as any associated description(s), may be displayed or otherwise conveyed to a user. The method may end at 116.

In accordance with an embodiment of the invention, a user may determine a job index key number based on the desired personnel, organization, and budgetary attributes selected by the user and used by the system in a query of a job index key number database. Additionally, a system and method in accordance with the invention may perform validation checks on selected personnel, organisation position placements, and budget allocations. For example, a system and method in accordance with the invention may at least verify the selection of a candidate for a job position, verify the selection of a job position for acceptability with a budget, or verify the selection of a person with the availability of a budget for that position. For example, a query may be generated to determine whether it is possible to finance a person with a budget element that is only available for a specific job index key number. A method or system according to the invention may check if this financing is valid by comparing budgetary information specific to that job index key number with salary associated with the selected person. In one embodiment, a system in accordance with the invention may check, in real-time, for validity between assignments of job index key numbers and between personnel, organization, and budgetary elements associated with that job index key number. For example, it may not be proper to finance a person with a budget element that is only available for a specific job index key number. A warning or error message may be generated to alert the user of such an outcome. A system in accordance with an embodiment of the invention may be enabled to check if certain financing is valid by, for example, comparing the personal and budgetary elements of a job index key number.

In one embodiment, a job index key number may correspond to a job index key number description that could be attributed as male, female, or neutral. When describing persons, a job index key number description may be gender-specific. When describing positions and budgetary elements a neutral description may be used. In one embodiment, a table associating gender with job index key number descriptions may be available. In the previous example, it may not matter if the Tax Office Manager was a man or a woman and thus the description may be neutral. One could, however, imagine a need for a gender-specific system, or at least a gender-specific option. For example, in a military situation, perhaps only males are permitted to fill wartime battlefield infantry positions. On the other hand, perhaps only females are permitted to guard female prisoners. Accordingly, one may imagine the need for individual job index key numbers for, perhaps, a "Prison Guard—Female" or a "Prison Guard—Male." These have the attributes of female and male, respectively. In one embodiment, a system may be gender-specific when dealing with persons, but remain neutral when dealing with positions and budgetary elements. In one embodiment, a user may designate the gender or neutrality of individual items.

In one embodiment, the system may generate a variety of information about a person. This information may be used in other contexts. On example of such a context may be in the reporting of context statistics—e.g., what is the percentage of female firefighters in a fire fighting organization where a specific budget was approved for female firefighters.

Information related to persons, organizational units (i.e., subunits of an organization), and budget elements may be collected from databases having information stored under attributes such as employee group/subgroup, personnel area/sub-area, employee pay scale groupings, and basic payments according to personal contracts. If a user identifies an attribute that is not available in a given database, then a neutral value may be entered for the missing attribute. In another embodiment, a user may enter customer specific information for any attribute or subset of the entire set of attributes. In one embodiment, any number of attributes may be added to a system (or database) in accordance with the invention. The additional attributes may comprise attributes added to customize, by a user, a system in accordance with an embodiment of the invention. It will be understood that any listings of attributes described herein are exemplary and not intended to be limiting.

The organizational area of activity of an individual or position can be described in several different ways as known to those of skill in the art. For example, two persons in the Air Force may have the same rank and receive the same pay; however, one may be a fighter pilot and the other a cargo aircraft pilot. In one embodiment, existing personnel and employee databases may be available to describe organizational area of activity of an individual or position.

If users have already defined these terms in a way that does not permit their use to model the organizational area of activity, additional entries and/or descriptions may be created. If an organizational structure exists for the administration of a complete state, the areas of activity beneath the complete state may be assigned to the individual organizational areas. In other words, the organization may be divided into main group and sub group elements. For example, in the case of the Treasury Department the complete state may be referred to as the financial administration. In turn, the financial administration could be divided into individual activity ranges, such as "Financial Administration—Management" and "Financial Administration—Local Tax Offices."

The main group/subgroup can be maintained for organizational units and positions within the organizational structure. Inheritance may take place within the organizational structure when the dimensions are not overwritten. The main group/subgroup can be defined as being time time-related. Accordingly, in one embodiment the main group and subgroups may vary dynamically.

In order to facilitate the generation of job index key numbers, various qualifiers may be defined. For example, a job index key number description may comprise a numeric code whose short and long texts make it possible to assign the unique office, grade, and job index key number description in a particular business entity. Once the area of activity is defined for an individual or position, a job index key number description can be determined based on these characteristics and the pay scale grouping of that individual or position. Where applicable, as stated above, job index key number descriptions can be defined for masculine, feminine, and neutral genders. This may also be beneficial for applications requiring gender-specific formatting for languages that make use of gender-specific words (e.g., Spanish).

Figure 2:
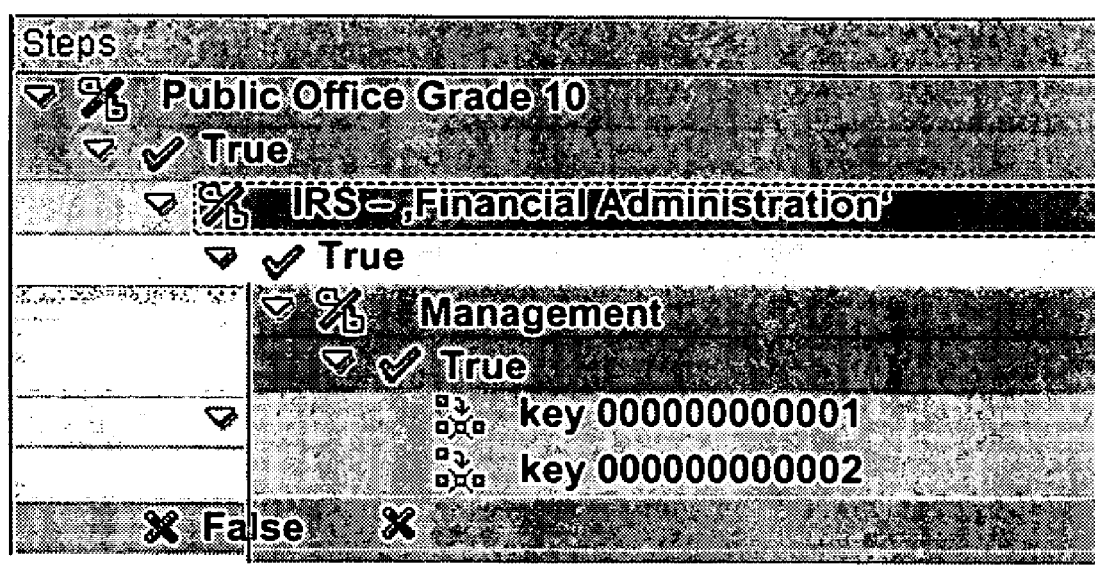
FIG. 2 is a graphical example of a decision tree 200 in accordance with an embodiment of the invention.

FIG. 2 is a graphical example of a decision tree 200 in accordance with an embodiment of the invention. In the example of FIG. 2, a user has entered a requirement that the desired job index key number be uniquely associated with a personnel requirement of being in "Public Office Grade 10" and an organization requirement of being in "IRS—Financial Administration" as well as in "Management." These attributes were selected from attributes stored in a personnel and organization databases. With such requirements, a decision tree structure could identify, from data stored in a job index key number database, those job index key numbers associated with the personnel and organizational requirements identified by the user. In the example of FIG. 2, the decision tree has determined that job index key numbers 000000000001 and 000000000002 apply. The personnel and organization requirements identified by the user may be satisfied by both job index key numbers, however, the first key may correspond to, or be associated with, the job index key number description of "Tax Office Manager" while the second key may correspond to the job index key number description of "Tax Inspector Manager."

In one embodiment, the input parameters of a decision tree are the organizational parameters of an individual, position, or budget structure element; personnel area/subarea (where available), employee group/subgroup, or main group and subgroup. In addition to the organizational parameters, the pay scale groupings are also provided. In one embodiment, the analysis period is also passed on.

A job index key number description key may then be generated according to, for example, these decision fields. It may be possible, for example, to assign the job index key number description of a "Tax Inspector" to an individual who is of a certain public office grade, such as a G10 and assigned to the tax authorities. Depending whether a male or a female is involved, the correct, gender-specific name can also be found in languages where this is necessary. In one embodiment, it may be possible to save the job index key number description as a function of time, as the titles can change over time.

Several alternative values for a job index key number description may be determined from the decision tree. These values can be displayed for a user (e.g., an administrator) who can select one of the available alternatives. It is noted that as used herein the term value refers to numeric, alphanumeric, and alpha characters.

Customers who already have their own groupings that can be used to describe an area of activity should be able to use them as well. To enable this, the decision tree may be made extendable, to enable additional customer fields to be added to the structure and filled. This may be necessary, for example, in the military and aerospace sectors.

In one embodiment, all possible job index key numbers and description, or a subset thereof, along with their abbreviations may be saved and/or displayed in a tabular form. In one embodiment, the job index key number may be 12 characters, the description may be 40 characters, and the abbreviation may be 12 characters in length. In one embodiment, a table may also store foreign descriptions (such as references to comparable NATO service grades). In one embodiment, the table can be generated to accommodate different languages. For example, for a user that is a US citizen the US description and abbreviation in English can be presented in the table, for a German citizen the German description and abbreviation in German can be presented in the table. Table 1 is an exemplary table presented in the English language:

TABLE 1

Exemplary Tabular Presentation of Job Index Key Number, Description, and Abbreviation

| Job Index Key Number | Description | Abbreviation |
|---|---|---|
| 000000000010 | Tax Inspector | TaxIns |
| 000000000011 | Ensign | Ensign |

A job index key number description may result from a combination of organizational criteria and the pay scale classification of a person, position, or budget structure element. To determine the job index key number description, a pay scale grouping may be evaluated together with the organizational criterion. For example, the job index key number description "tax inspector" may be given to an inspector who works for the IRS. Table 2 is another example of a table that may be generated based on a determination of attributes in a decision tree application appears as follows:

TABLE 2

Table resulting from determination of attributes in a decision tree application

| Pay Scale Type | Pay Scale Area | Pay Scale ID | Pay Scale Group | Org. Criterion 1 | Org. Criterion 2 | Job Index Key Number |
|---|---|---|---|---|---|---|
| PSRA | West | Civil servant | G10 | IRS | | 000000000010 |
| PSRA | West | Civil servant | G10 | Navy | | 000000000011 |

A table, such as that illustrated in Table 1, Table 2, or any other tabular presentation, may also display a default value for the job index key number description, which a user (e.g., an administrator) can overwrite. A job index key number description might be considered closely with the pay scale grouping, and therefore are preferably entered in the same maintenance screen. Therefore, if the pay scale grouping changes, the job index key number description can be changed directly along with it. The organizational criteria can be defined individually for each user. For example, the employee group/subgroup could be used.

For individuals, it should be possible to maintain the job index key number description in a maintenance screen. A default value may be determined and can be overwritten as necessary.

Figure 3:
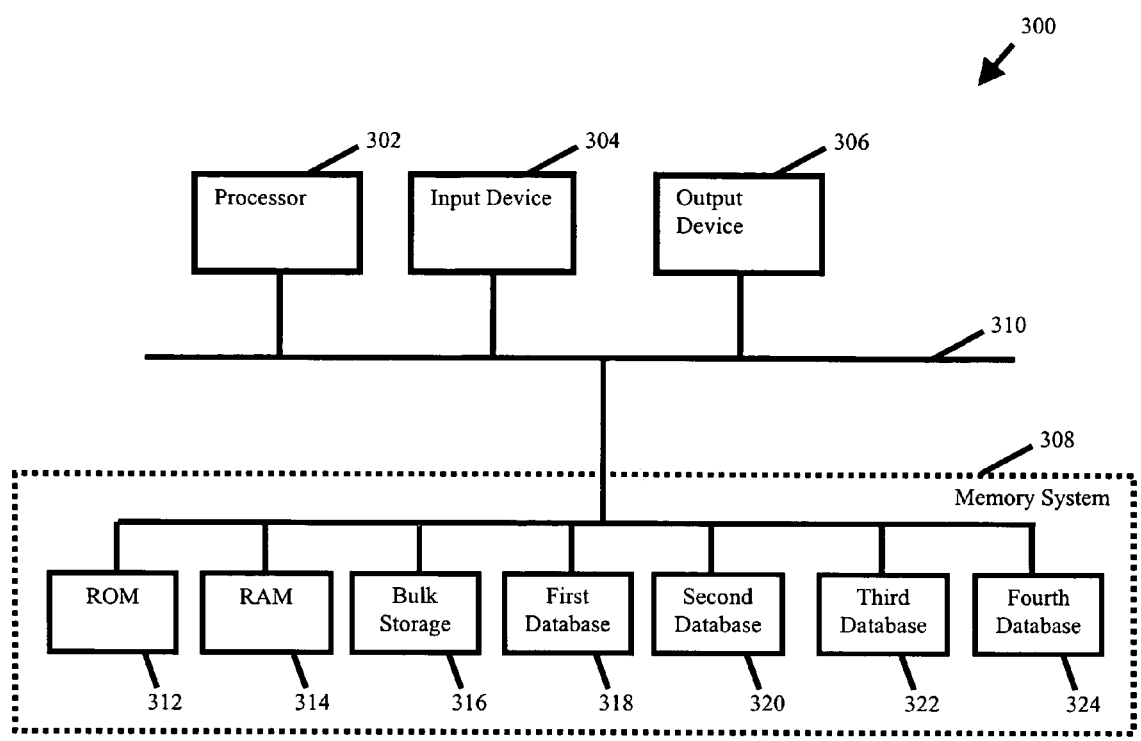
FIG. 3 is a system to generate a job index key number in accordance with an embodiment of the invention.

FIG. 3 is a system to generate a job index key number in accordance with an embodiment of the invention. It is noted that the functionality of the foregoing embodiments may be provided on various computer platforms executing program instructions. One such platform 300 is illustrated in the simplified block diagram of FIG. 3. There, the platform 300 is shown as being populated by a processor 302, an input device 304, an output device 306, and a memory system 308. A bus 310 may couple all components and/or units or subunits of the platform 300. The processor 302 may be any of a plurality of conventional processing systems, including microprocessors, digital signal processors and field programmable logic arrays. In some applications, it may be advantageous to provide multiple processors (not shown) in the platform 300. The processor(s) 302 execute program instructions stored in the memory system 308. The memory system 308 may include any combination of conventional memory circuits, including electrical, magnetic or optical memory systems. As shown in FIG. 3, the memory system may include read only memories 312, random access memories 314, and bulk storage 316. The memory system not only stores the program instructions representing the various methods described herein but also can store the data items on which these methods operate. The memory system 308 may include a first database 318, a second database 320, a third database 322, and a fourth database 324.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method, comprising:
   selecting a first set of attributes from a personnel database;
   selecting a second set of attributes from an organizational database;
   selecting a third set of attributes from a budgetary database; wherein the personnel database, the organizational database, and the budgetary database are distinct;
   forming a query from the first set of attributes, the second set of attributes and the third set of attributes;
   searching a separate job index key number database using the query, wherein the job index key number database comprises one or more predetermined job index key numbers and wherein each job index key number stored in the job index key number database comprises a unique identifier that identifies a unique combination of personnel, organizational and budgetary attributes;
   determining if any job index key number stored in the job index key number database matches the query;
   if at least one job index key number matches the query:
      searching a job index key number description database for at least one job index key number job description that matches the at least one job index key number matching the query, wherein the job index key number description database comprises one or more predetermined job index key number job descriptions that correspond to the one or more predetermined job index key numbers;
      outputting the at least one job index key number matching the query; and
      outputting the at least one job index key number job description that matches the at least one job index key number matching the query.

2. The method of claim 1, wherein the at least one job index key number job description that matches the at least one job index key number matching the query is a textual description comprising a job title.

3. The method of claim 1, wherein the at least one job index key number job description that matches the at least one job index key number matching the query is a textual description comprising an abbreviation of a job title.

4. The method of claim 1, wherein the at least one job index key number job description that matches the at least one job index key number matching the query is in a language native to the user.

5. The method of claim 1, further comprising prompting the user to input a free job index key number if at least one job index key number does not match the query.

6. The method of claim 1, further comprising generating a new job index key number if at least one job index key number does not match the query.

7. The method of claim 1, wherein the at least one job index key number job description that matches the at least one job index key number matching the query comprises a textual description of a job.

8. A system, comprising:
   a processor;

an output device; and
a personnel database;
an organizational database;
a budgetary database; wherein the personnel database, the organizational database, and the budgetary database are distinct; and
a set of instructions to be executed by the processor, the set of instructions comprising instructions to:
  select a first set of attributes from the personnel database;
  select a second set of attributes from the organizational database;
  select a third set of attributes from the budgetary database;
  form a query from the first set of attributes, the second set of attributes and the third set of attributes;
  search a separate job index key number database using the query, wherein the job index key number database comprises one or more predetermined job index key numbers and wherein each job index key number stored in the job index key number database comprises a unique identifier that identifies a unique combination of personnel, organizational and budgetary attributes;
  determine if any job index key number stored in the job index key number database matches the query;
  search a job index key number description database, when at least one job index key number matches the query, for at least one job index key number job description that matches the at least one job index key number matching the query, wherein the job index key number description database comprises one or more predetermined job index key number job descriptions that correspond to the one or more predetermined job index key numbers;
  output the at least one job index key number matching the query; and
  output the at least one job index key number job description that matches the at least one job index key number matching the query.

9. The system of claim 8, wherein the at least one job index key number job description that matches the at least one job index key number matching the query is a textual description comprising a job title.

10. The system of claim 8, wherein the at least one job index key number job description that matches the at least one job index key number matching the query is a textual description comprising an abbreviation of a job title.

11. The system of claim 8, wherein the at least one job index key number job description that matches the at least one job index key number matching the query is in a language native to the user.

12. The system of claim 8, wherein the processor executes a set of instructions stored in the memory of the system to prompt the user, via the output device, to input, via an input device, a free job index key number when at least one job index key number does not match the query.

13. The system of claim 8, wherein the processor generates a new job index key number when at least one job index key number does not match the query.

14. The system of claim 8, wherein the at least one job index key number job description that matches the at least one job index key number matching the query comprises a textual description of a job.

* * * * *